US012603314B1

(12) United States Patent
Wingo et al.

(10) Patent No.: US 12,603,314 B1
(45) Date of Patent: Apr. 14, 2026

(54) FUEL CELL EXHAUST GAS PROCESSING

(71) Applicant: EQT Corporation, Pittsburgh, PA (US)

(72) Inventors: Robert R. Wingo, Pittsburgh, PA (US);
James P. McCann, Pittsburgh, PA
(US); Albert T. Girgis, Pittsburgh, PA
(US); Michael F. Starck, Pittsburgh,
PA (US)

(73) Assignee: EQT CORPORATION, Pittsburgh, PA
(US)

( * ) Notice: Subject to any disclaimer, the term of this
patent is extended or adjusted under 35
U.S.C. 154(b) by 0 days.

(21) Appl. No.: 19/084,769

(22) Filed: Mar. 20, 2025

Related U.S. Application Data

(63) Continuation of application No. 19/046,432, filed on
Feb. 5, 2025.

(51) Int. Cl.
| | |
|---|---|
| *H01M 8/0668* | (2016.01) |
| *H01M 8/04007* | (2016.01) |
| *H01M 8/0612* | (2016.01) |
| *H01M 8/12* | (2016.01) |

(52) U.S. Cl.
CPC ..... *H01M 8/0668* (2013.01); *H01M 8/04067*
(2013.01); *H01M 8/0631* (2013.01); *H01M
2008/1293* (2013.01)

(58) Field of Classification Search
None
See application file for complete search history.

(56) References Cited

U.S. PATENT DOCUMENTS

| | | | | |
|---|---|---|---|---|
| 12,303,830 | B2* | 5/2025 | Thanganadar | ....... H02K 7/1823 |
| 2023/0202840 | A1* | 6/2023 | Flanders | .............. C25B 15/083 |
| | | | | 252/373 |
| 2025/0109347 | A1* | 4/2025 | Mennell | .................... C10L 9/08 |
| 2025/0256957 | A1* | 8/2025 | Stallmann | ............ B01D 53/002 |

* cited by examiner

*Primary Examiner* — Scott J. Chmielecki
(74) *Attorney, Agent, or Firm* — XSENSUS LLP

(57) ABSTRACT

A system may include a cooling device configured to receive
exhaust gases, generated by a solid oxide fuel cell, including
water vapor, carbon dioxide, nitrogen, hydrogen, and carbon
monoxide. The cooling device may be further configured to
cool the exhaust gases producing cooled exhaust gases. The
system may further include a compression device configured
to compress the cooled exhaust gases to produce compressed
exhaust gases. The system may further include a carbon
capture device configured to capture at least a portion of the
carbon dioxide from the compressed exhaust gases to pro-
duce treated exhaust gases. The hydrogen and the carbon
monoxide may be majority components of the treated
exhaust gases.

20 Claims, 11 Drawing Sheets

100

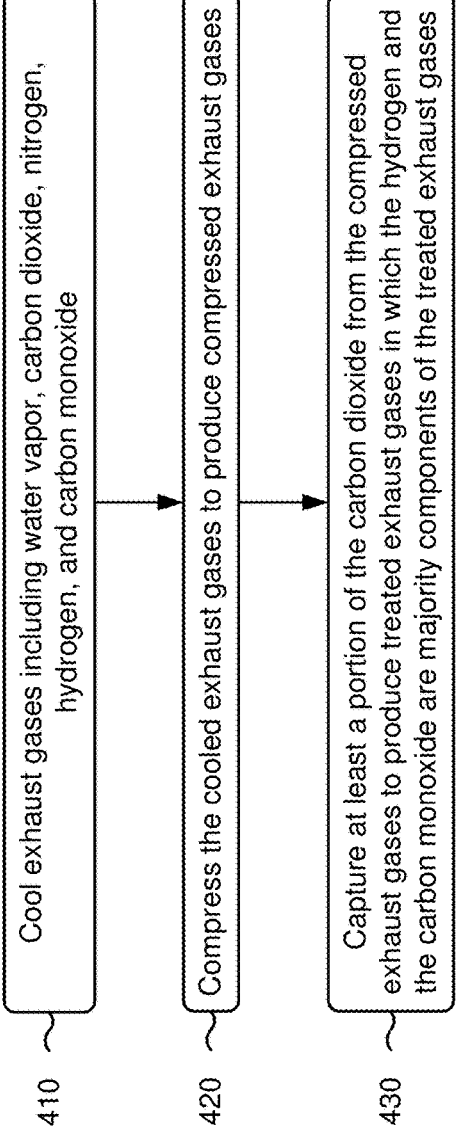

400

410 Cool exhaust gases including water vapor, carbon dioxide, nitrogen, hydrogen, and carbon monoxide 420 Compress the cooled exhaust gases to produce compressed exhaust gases 430 Capture at least a portion of the carbon dioxide from the compressed exhaust gases to produce treated exhaust gases in which the hydrogen and the carbon monoxide are majority components of the treated exhaust gases

FIG. 4

FUEL CELL EXHAUST GAS PROCESSING

CROSS-REFERENCE TO RELATED APPLICATION

This continuation application claims the benefit of U.S. Nonprovisional application Ser. No. 19/046,432, filed Feb. 5, 2025, which is incorporated herein by reference in its entirety.

BACKGROUND

Fuel cells are devices that generate electricity by converting carbon-based fuels, such as methane and propane, into electrical energy and gaseous byproducts. While the electricity generated is a valuable output, the gaseous byproducts, including carbon dioxide and carbon monoxide, are typically considered undesirable and environmentally harmful because of their contribution to greenhouse gas emissions. These gaseous byproducts are often sequestered to prevent their release into the atmosphere, increasing a complexity and cost of fuel cell operation.

A fischer-tropsch (FT) process is a chemical process that converts synthesis gas (e.g., syngas), a mixture of carbon monoxide and hydrogen, into liquid hydrocarbons. These hydrocarbons are typically used in various applications, including as aviation fuel. The syngas required for the FT process is produced through energy-intensive methods such, as methane reforming.

SUMMARY

Some implementations described herein relate to a system, comprising: a cooling device configured to: receive exhaust gases, generated by a solid oxide fuel cell, including water vapor, carbon dioxide, nitrogen, hydrogen, and carbon monoxide, and cool the exhaust gases to produce cooled exhaust gases, wherein cooling the exhaust gases condenses at least a portion of the water vapor in the exhaust gases; a compression device configured to compress the cooled exhaust gases to produce compressed exhaust gases; and a carbon capture device configured to capture at least a portion of the carbon dioxide from the compressed exhaust gases to produce treated exhaust gases, wherein the hydrogen and the carbon monoxide are majority components of the treated exhaust gases.

Some implementations described herein relate to a method, comprising: cooling, by a cooling device, exhaust gases generated by a solid oxide fuel cell, wherein the exhaust gases include water vapor, carbon dioxide, nitrogen, hydrogen, and carbon monoxide, and wherein cooling the exhaust gases condenses at least a portion of the water vapor to produce cooled exhaust gases; compressing, by a compression device, the cooled exhaust gases to produce compressed exhaust gases; and capturing, by a carbon capture device, at least a portion of the carbon dioxide from the compressed exhaust gases to produce treated exhaust gases, wherein the hydrogen and the carbon monoxide are majority components of the treated exhaust gases.

Some implementations described herein relate to a non-transitory computer-readable medium storing a set of instructions, the set of instructions comprising: one or more instructions that, when executed by one or more processors of a device, cause the device to: cause a cooling device to: receive exhaust gases, generated by a solid oxide fuel cell, including water vapor, carbon dioxide, nitrogen, hydrogen, and carbon monoxide, and cool the exhaust gases to produce cooled exhaust gases, wherein cooling the exhaust gases condenses at least a portion of the water vapor in the exhaust gases; cause a compression device to compress the cooled exhaust gases to produce compressed exhaust gases; and cause a carbon capture device to capture at least a portion of the carbon dioxide from the compressed exhaust gases to produce treated exhaust gases, wherein the hydrogen and the carbon monoxide are majority components of the treated exhaust gases.

BRIEF DESCRIPTION OF THE DRAWINGS

FIG. 4 is a flowchart of an example process associated with fuel cell exhaust gas processing.

DETAILED DESCRIPTION

Figure 1A:
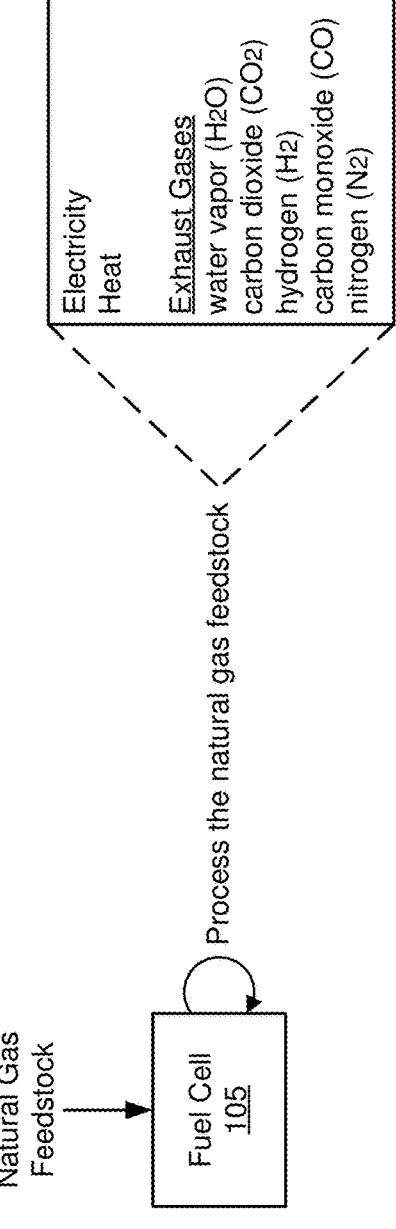
FIGS. 1A-1H are diagrams of an example associated with fuel cell exhaust gas processing.

The following detailed description of example implementations refers to the accompanying drawings. The same reference numbers in different drawings may identify the same or similar elements.

At a front-end of a fischer-tropsch (FT) process, a methane ($CH_4$) reformer is typically employed to produce syngas by reforming hydrocarbons. For example, the methane reformer may reform methane to generate a syngas mixture with a desired hydrogen-to-carbon monoxide ratio. If there are significant quantities of hydrocarbons heavier than methane, such as $C_2^+$ hydrocarbons (e.g., hydrocarbons containing two or more carbon atoms, starting with ethane ($C_2H_6$) and including heavier hydrocarbons, such as propane ($C_3H_8$) and/or butane ($C_4H_{10}$), among other examples), a pre-reformer may be added upstream of the methane reformer. The pre-reformer may convert these heavier hydrocarbons into methane and lighter compounds to optimize the syngas production process. This syngas may serve as a primary feedstock for the FT process, facilitating a catalytic synthesis of liquid hydrocarbons that may be utilized in applications, such as transportation fuels, lubricants, and/or chemical feedstock applications.

However, integrating the methane reformer at the front end of the FT process introduces several challenges. For example, methane reforming involves managing reactions with vastly different energy profiles: autothermal reforming and partial oxidation are highly exothermic processes that generate heat, which must be efficiently handled, while steam reforming and dry methane reforming are highly endothermic processes and require significant external energy input to sustain the reactions. As a result, the methane reforming process demands careful heat integration to balance energy flows, involves a use of durable materials and equipment capable of withstanding harsh operating conditions, and requires substantial operational resources to ensure efficiency and reliability.

FIGS. 1A-1H are diagrams of an example 100 associated with fuel cell exhaust gas processing. As shown in FIGS. 1A-1H, the example 100 includes a fuel cell 105, an exhaust gas blower device 110, a cooling device 115, a compression device 120 (e.g., a gas compression device), a carbon capture device 125, an FT reactor (FTR) device 130, a water gas-shift device 135, a pressure swing adsorption (PSA) device 140, a dry methane reformer device 145 (e.g., a carbon dioxide reformer device), an air separator device 150, an ammonia converter device 155, and a methanol synthesis device 160. These devices are described in more detail in connection with FIGS. 2 and 3.

In some implementations, the fuel cell 105 may be a solid oxide fuel cell (SOFC) including an anode, an electrolyte, and a cathode. For example, the anode may include a nickel-yttria-stabilized zirconia (Ni—YSZ) composite designed to facilitate hydrogen oxidation reactions, the electrolyte may be a ceramic layer (e.g., a dense ceramic layer including YSZ), which may selectively allow a flow of oxygen ions while blocking a flow of electrons), and the cathode may include materials that are designed to catalyze oxygen reduction reactions (e.g., a lanthanum strontium manganite (LSM) material).

In some implementations, the fuel cell 105 may process a fuel, such as natural gas, to generate electricity (e.g., using a combination of reforming and electrochemical conversion to transform chemical energy into electrical energy), as described in more detail elsewhere herein. As an example, the fuel cell 105 may perform one or more reforming processes (e.g., to chemically convert hydrocarbon fuels into a gas mixture with higher amounts of hydrogen relative to other components). The one or more reforming processes may include catalytic reactions, such as steam reforming (e.g., where methane reacts with steam ($H_2O$) in a presence of a nickel-based catalyst, producing hydrogen ($H_2$), carbon monoxide (CO), and carbon dioxide ($CO_2$)), a water gas-shift reaction (e.g., where carbon monoxide from steam reforming reacts with additional steam to produce additional hydrogen and carbon dioxide), autothermal reforming (e.g., a combination of steam reforming and partial oxidation of methane using both oxygen and steam to produce hydrogen and carbon monoxide), and/or dry methane reforming (e.g., where a one-carbon hydrocarbon, such as methane, reacts with carbon dioxide in a presence of a catalyst, producing hydrogen and carbon monoxide without the use of steam).

As another example, the fuel cell 105 may perform one or more electrochemical processes (e.g., to convert the chemical energy in hydrogen and carbon monoxide into electrical energy through reduction-oxidation (redox) reactions). The one or more electrochemical processes may include oxygen reduction at the cathode (e.g., where oxygen molecules from air are reduced to oxygen ions by gaining electrons supplied via an external circuit and the oxygen ions then migrate through the solid oxide electrolyte to the anode), hydrogen oxidation at the anode (e.g., where hydrogen reacts with oxygen ions at the anode, producing water and releasing electrons where the electrons travel through the external circuit, generating electric current), and/or carbon monoxide oxidation at the anode (e.g., where carbon monoxide (CO) reacts with oxygen ions to form carbon dioxide ($CO_2$) and release additional electrons, ensuring efficient utilization of the reformate gases.).

In addition to generating electrical energy, the fuel cell 105 may produce (e.g., as a byproduct) thermal energy (e.g., heat). This thermal energy may be generated by exothermic oxidation reactions that occur at the anode and cathode during the electrochemical conversion process. The heat produced may be used for cogeneration purposes and/or for driving other processes associated with the fuel cell 105. Furthermore, exhaust gases may be produced as a result of both the reforming processes and the electrochemical reactions at the anode. These exhaust gases are typically released from the system as byproducts of the overall energy conversion process. The exhaust gases may include water vapor, carbon dioxide, hydrogen, carbon monoxide, and nitrogen.

As illustrated in FIG. 1A, the fuel cell 105 may receive a natural gas feedstock. In some implementations, a composition of the natural gas feedstock may include higher amounts of methane relative to other components (e.g., methane may be between approximately 70% and 98% of a total volume of the composition, among other examples). Although the natural gas feedstock is described as including higher amounts of methane relative to other components, the natural gas feedstock may include any suitable composition.

As further shown in FIG. 1A, the fuel cell 105 may process the natural gas feedstock. For example, the fuel cell 105 may process the natural gas feedstock to generate electricity, thermal energy (e.g., shown as heat), and exhaust gases (e.g., shown as water vapor ($H_2O$), carbon dioxide, hydrogen ($H_2$), carbon monoxide (CO), and nitrogen ($N_2$)), as described in more detail elsewhere herein. In some implementations, amounts of the water vapor and the carbon dioxide may be higher relative to amounts of the hydrogen, the carbon monoxide, and the nitrogen.

Figure 1B:
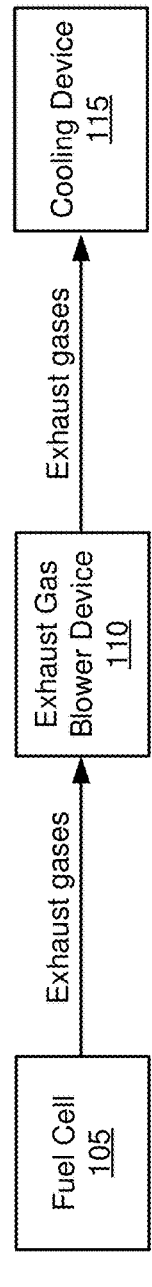
Figure 1B:
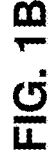

As shown in FIG. 1B, the exhaust gas blower device 110 may facilitate transport of the exhaust gases. In some implementations, the exhaust gas blower device 110 may be an inlet gas blower device configured to collect the exhaust gases generated by the fuel cell 105. For example, the exhaust gas blower device 110 may draw the exhaust gases from the fuel cell 105 (e.g., under positive pressure). As further shown in FIG. 1B, the exhaust gas blower device 110 may transport the exhaust gases to the cooling device 115 (e.g., the exhaust gas blower device 110 may move the exhaust gases through a controlled path to feed the exhaust gases into the cooling device 115).

Figure 1C:
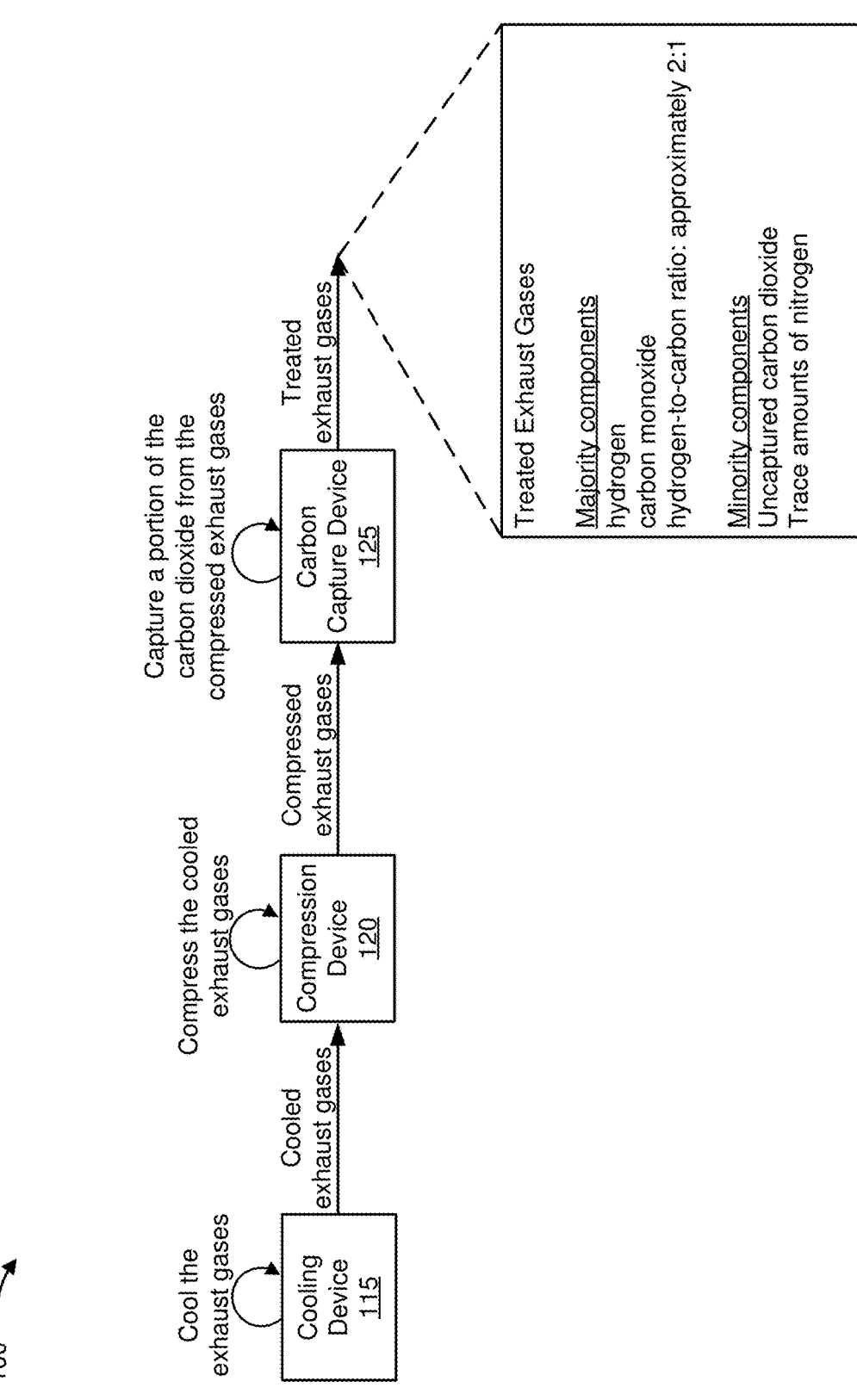

As shown in FIG. 1C, the cooling device 115 may cool the exhaust gases (e.g., after receiving the exhaust gases from the exhaust gas blower device 110). In some implementations, the cooling device 115 may be a quench device (e.g., a quench tower, among other examples) configured to quench the exhaust gases. In some implementations, the water vapor may be condensed from the exhaust gases (e.g., as a result of being cooled by the cooling device 115). Accordingly, for example, an amount of the water vapor in the cooled exhaust gases may be lower than an amount of the water vapor in the exhaust gases (e.g., the cooled exhaust gases may include no water vapor or trace amounts of water vapor, among other examples).

As further shown in FIG. 1C, the cooling device 115 may output cooled exhaust gases (e.g., which may be fed to the compression device 120). As further shown in FIG. 1C, the compression device 120 may receive the cooled exhaust gases, compress the cooled exhaust gases to produce compressed exhaust gases, and output the compressed exhaust gases (e.g., the compression device 120 may provide the compressed exhaust gases to the carbon capture device 125 for further processing).

In some implementations, a pressure of the compressed exhaust gases may be associated with a pressure level that is suitable for effective carbon dioxide removal in sufficient quantities to operate efficiently with an FT reaction. Accordingly, the compression device 120 may compress the cooled exhaust gases to produce treated exhaust gases at a pressure level that provides a suitable driving force for efficient carbon dioxide, ensuring that the extracted carbon dioxide meets a required purity and flow rate for downstream processing, such as sequestration and/or utilization in synthesis reactions, among other examples.

As further shown in FIG. 1C, the carbon capture device 125 may receive the compressed exhaust gases, capture at least a portion of the carbon dioxide from the compressed exhaust gases to produce treated exhaust gases, and output the treated exhaust gases. In some implementations, the carbon dioxide (e.g., captured by the carbon capture device 125) may be associated with a threshold (e.g., a purity level of at least approximately 95% on a water-free basis, among other examples) that enables the carbon dioxide to be used for other purposes (e.g., the carbon dioxide may have a purity level enabling the carbon dioxide to be sold and/or sequestered).

As further shown in FIG. 1C, the treated exhaust gases may include majority components (e.g., shown as hydrogen and carbon monoxide) and minority components (e.g., shown as uncaptured carbon dioxide and trace amounts of nitrogen). In some implementations, a hydrogen-to-carbon (H/C) ratio of the hydrogen and the carbon included in the treated exhaust gases may enable the treated exhaust gases to be used for various purposes, as described in more detail elsewhere herein. For example, the H/C ratio of the hydrogen and the carbon in the treated exhaust gases may be approximately 2:1, among other examples.

In this way, the exhaust gases (e.g., produced by the fuel cell 105) may be processed to create treated exhaust gases having majority components of hydrogen and carbon monoxide and minority components of carbon dioxide and nitrogen. The treated exhaust gases may be further processed to generate one or more gas-to-liquid (GTL products), as described in more detail elsewhere herein.

Figure 1D:
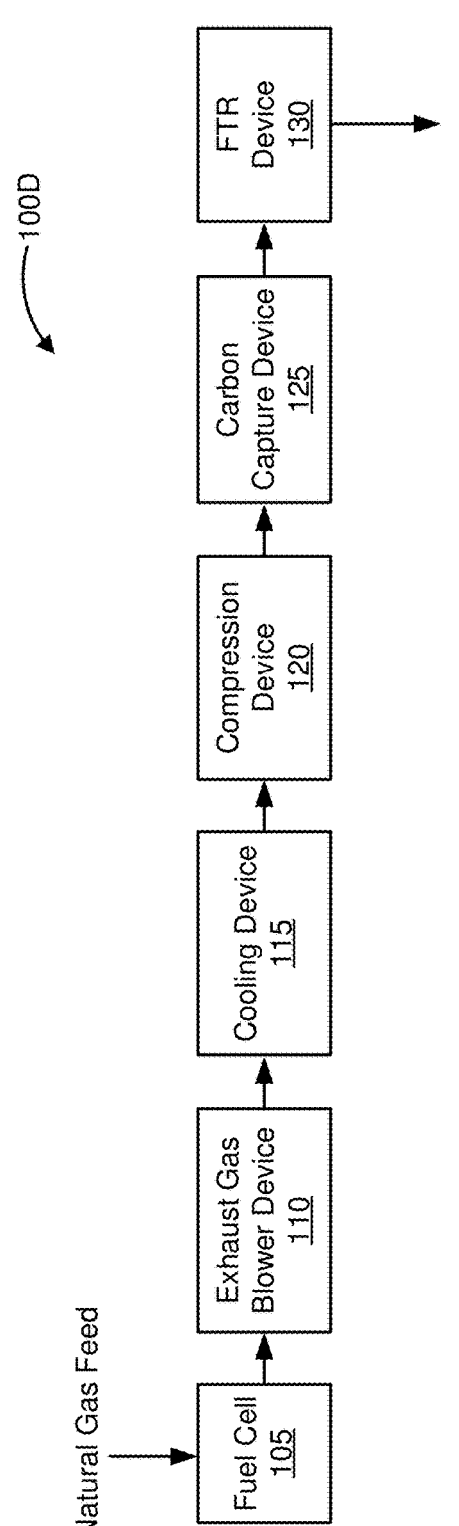

FIG. 1D is a diagram of an example fuel cell system 100D associated with processing fuel cell exhaust gases to generate liquid hydrocarbons. As shown in FIG. 1D the fuel cell system 100D includes the fuel cell 105, the exhaust gas blower device 110, the cooling device 115, the compression device 120, the carbon capture device 125, and the FTR device 130.

The cooling device 115, the compression device 120, and the carbon capture device 125 may process the exhaust gases (e.g., produced by the fuel cell 105 and transported via the exhaust gas blower device 110) to create the treated exhaust gases, as described in more detail elsewhere herein. In some implementations, the carbon capture device 125 may provide the treated exhaust gases to the FTR device 130 for further processing.

The FTR device 130 may receive the treated exhaust gases and process the treated exhaust gases to generate liquid hydrocarbons. For example, the treated exhaust gases may be injected into the FTR device 130 (e.g., at a controlled rate and pressure to optimize FT synthesis). The FTR device 130 may convert the hydrogen and the carbon monoxide (e.g., included in the treated exhaust gases at the H/C ratio of approximately 2:1) into liquid hydrocarbons. The liquid hydrocarbons may then be separated, upgraded, and/or further processed into various liquid fuels and chemicals.

Figure 1E:
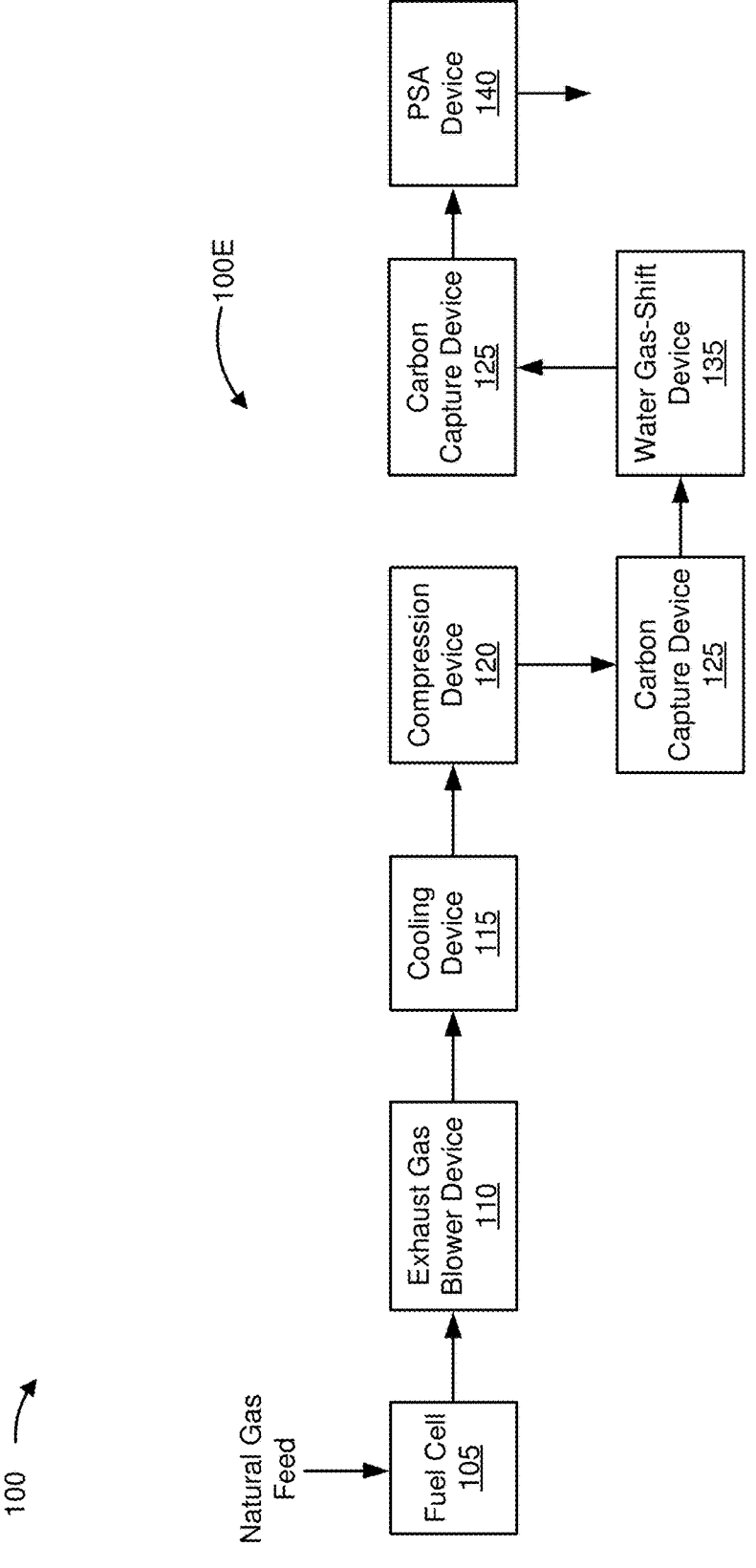

FIG. 1E is a diagram of an example fuel cell system 100E associated with processing fuel cell exhaust gases to generate hydrogen. As shown in FIG. 1E the fuel cell system 100E includes the fuel cell 105, the exhaust gas blower device 110, the cooling device 115, the compression device 120, the carbon capture device 125, the water gas-shift device 135, and the PSA device 140.

The cooling device 115, the compression device 120, and the carbon capture device 125 may process the exhaust gases (e.g., produced by the fuel cell 105 and transported via the exhaust gas blower device 110) to create the treated exhaust gases, as described in more detail elsewhere herein. The carbon capture device 125 may provide the treated exhaust gases to the water gas-shift device 135 for further processing.

The water gas-shift device 135 may receive the treated exhaust gases, process the treated exhaust gases to convert carbon monoxide into hydrogen and carbon dioxide, and output hydrogen enriched-gases (e.g., the water gas-shift device 135 may provide the hydrogen-enriched gases to the carbon capture device 125 for further processing). For example, the carbon capture device 125 may receive the hydrogen-enriched gases, capture at least a portion of the carbon dioxide from the hydrogen-enriched gases to produce treated hydrogen-enriched gases, and output the treated hydrogen-enriched gases (e.g., the carbon capture device 125 may provide the treated hydrogen-enriched gases to the PSA device 140 for further processing). Accordingly, and in some implementations, the fuel cell system 100E may utilize the carbon capture device 125 upstream and downstream of the water gas-shift device 135 to recover the carbon dioxide at a pressure level that enables efficient recovery of the carbon dioxide. In this way, carbon dioxide is prevented or mitigated from accumulating in a feed line of the water gas-shift device 135, which could otherwise negatively affect a reaction equilibrium (e.g., could otherwise shift the reaction equilibrium unfavorably) and reduce hydrogen yield. The PSA device 140 may receive the treated hydrogen-enriched gases and process the treated hydrogen-enriched gases to generate hydrogen.

Figure 1F:
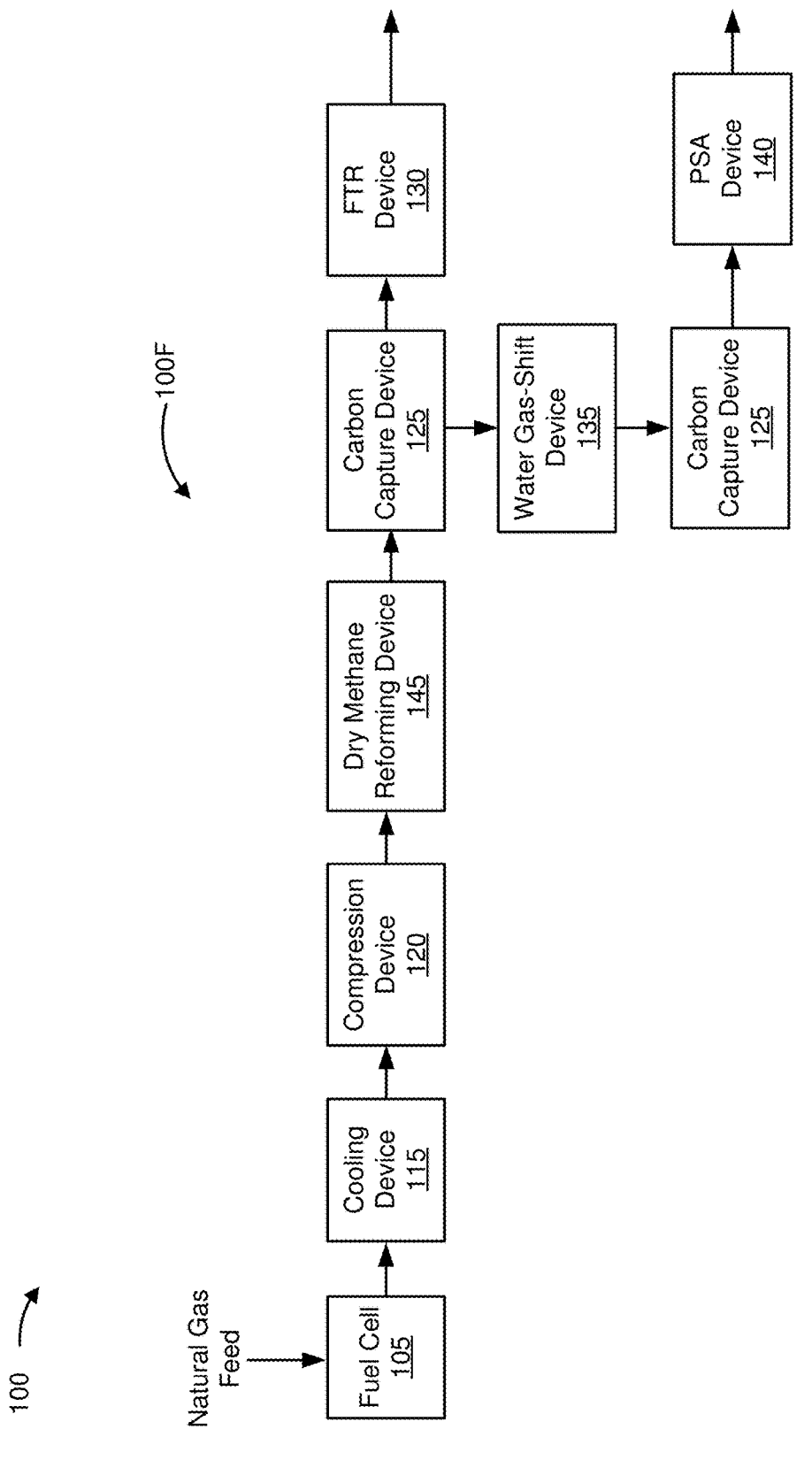

FIG. 1F is a diagram of an example fuel cell system 100F associated with processing fuel cell exhaust gases to generate carbon monoxide and hydrogen. As shown in FIG. 1F, the fuel cell system 100F includes the fuel cell 105, the cooling device 115, the compression device 120, the carbon capture device 125, the FTR device 130, the water gas-shift device 135, the PSA device 140, and the dry methane reformer device 145.

In some implementations, the cooling device 115, the compression device 120 may process the exhaust gases (e.g., produced by the fuel cell 105 and transported via the exhaust gas blower device 110) to create the compressed exhaust gases, as described in more detail elsewhere herein.

In some implementations, the dry methane reformer device 145 may receive the compressed exhaust gases (e.g., from the compression device 120), process the compressed exhaust gases to produce reformed exhaust gases, and output the reformed exhaust gases (e.g., to the carbon capture device 125). For example, the reformed exhaust gases may include carbon monoxide and hydrogen (e.g., converted from methane). The reformed exhaust gases may be provided to the carbon capture device 125.

In some implementations, an H/C ratio of hydrogen and carbon included in the reformed exhaust gases may enable the reformed exhaust gases to be used for various purposes, as described in more detail elsewhere herein. For example, the H/C ratio of the hydrogen and the carbon in the reformed exhaust gases may be approximately 2:1, among other examples.

The carbon capture device 125 and the FTR device 130 may process the reformed exhaust gases to generate liquid hydrocarbons, as described in more detail elsewhere herein. The carbon capture device 125, the water gas-shift device 135, and the PSA device 140 may process the reformed exhaust gases to generate hydrogen, as described in more detail elsewhere herein.

Figure 1G:
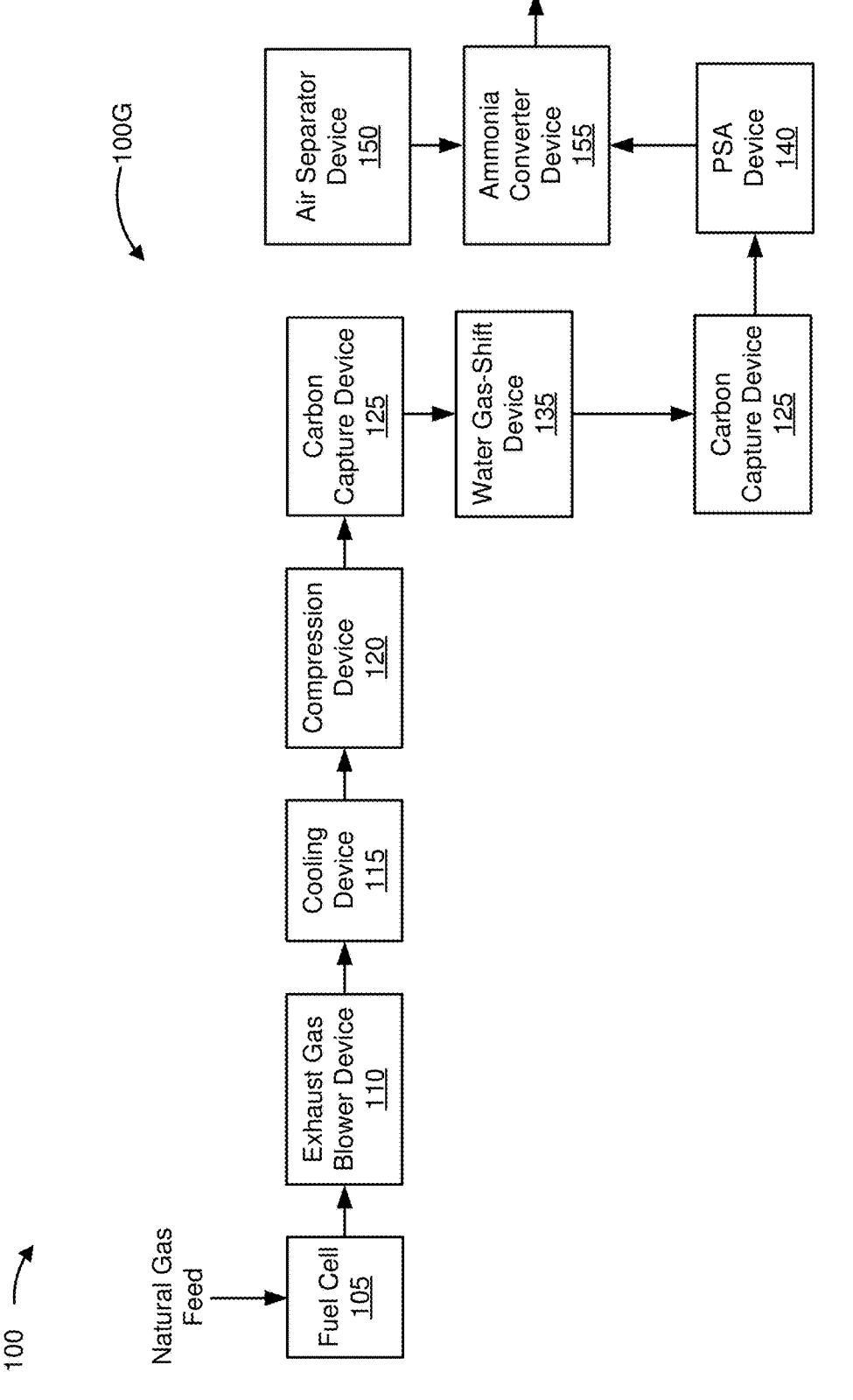

FIG. 1G is a diagram of an example fuel cell system 100G associated with processing fuel cell exhaust gases to generate ammonia. As shown in FIG. 1G the fuel cell system 100G includes the fuel cell 105, the exhaust gas blower device 110, the cooling device 115, the compression device 120, the carbon capture device 125, the water gas-shift device 135, the PSA device 140, the air separator device 150, and the ammonia converter device 155.

The cooling device 115, the compression device 120, the carbon capture device 125, the water gas-shift device 135, and the PSA device 140 may process the exhaust gases (e.g., produced by the fuel cell 105 and transported via the exhaust gas blower device 110) to generate hydrogen, as described in more detail elsewhere herein.

The PSA device 140 may provide the hydrogen to the ammonia converter device 155. The air separator device 150 may perform a separation procedure to produce nitrogen (e.g., the air separator device 150 may separate nitrogen from air). The air separator device 150 may provide the nitrogen to the ammonia converter device 155. The ammonia converter device 155 may receive the hydrogen (e.g., from the PSA device 140) and the nitrogen (e.g., from the air separator device 150) for processing. The ammonia converter device 155 may process the hydrogen and the nitrogen to generate ammonia (e.g., the ammonia converter device 155 may react the hydrogen with the nitrogen to generate ammonia).

Figure 1H:
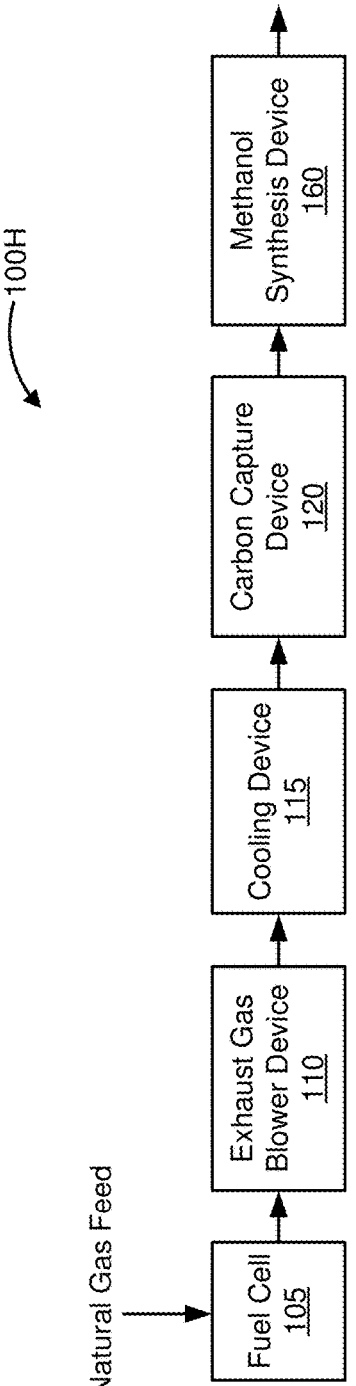

FIG. 1H is a diagram of an example fuel cell system 100H associated with processing fuel cell exhaust gases to generate methanol. As shown in FIG. 1H the fuel cell system 100H includes the fuel cell 105, the exhaust gas blower device 110, the cooling device 115, the carbon capture device 125, and the methanol synthesis device 160.

The fuel cell 105, the exhaust gas blower device 110, the cooling device 115, and the carbon capture device 125 may process the exhaust gases (e.g., produced by the fuel cell 105 and transported via the exhaust gas blower device 110) to produce the treated exhaust gases, as described in more detail elsewhere herein. In some implementations, the methanol synthesis device 160 may receive the treated exhaust gases and process the treated exhaust gases to generate methanol.

For example, the methanol synthesis device 160 may include a catalytic reactor containing one or more catalysts suitable for methanol production, operating under elevated pressure and temperature conditions, where unreacted gases may be recycled to improve efficiency, and where the synthesized methanol undergoes condensation and purification to remove excess components and byproducts. This ensures high-purity methanol for various downstream applications such as fuel production, chemical feedstock, and/or energy storage, among other examples.

As indicated above, FIGS. 1A-1H are provided as an example. Other examples may differ from what is described with regard to FIGS. 1A-1H.

Figure 2:
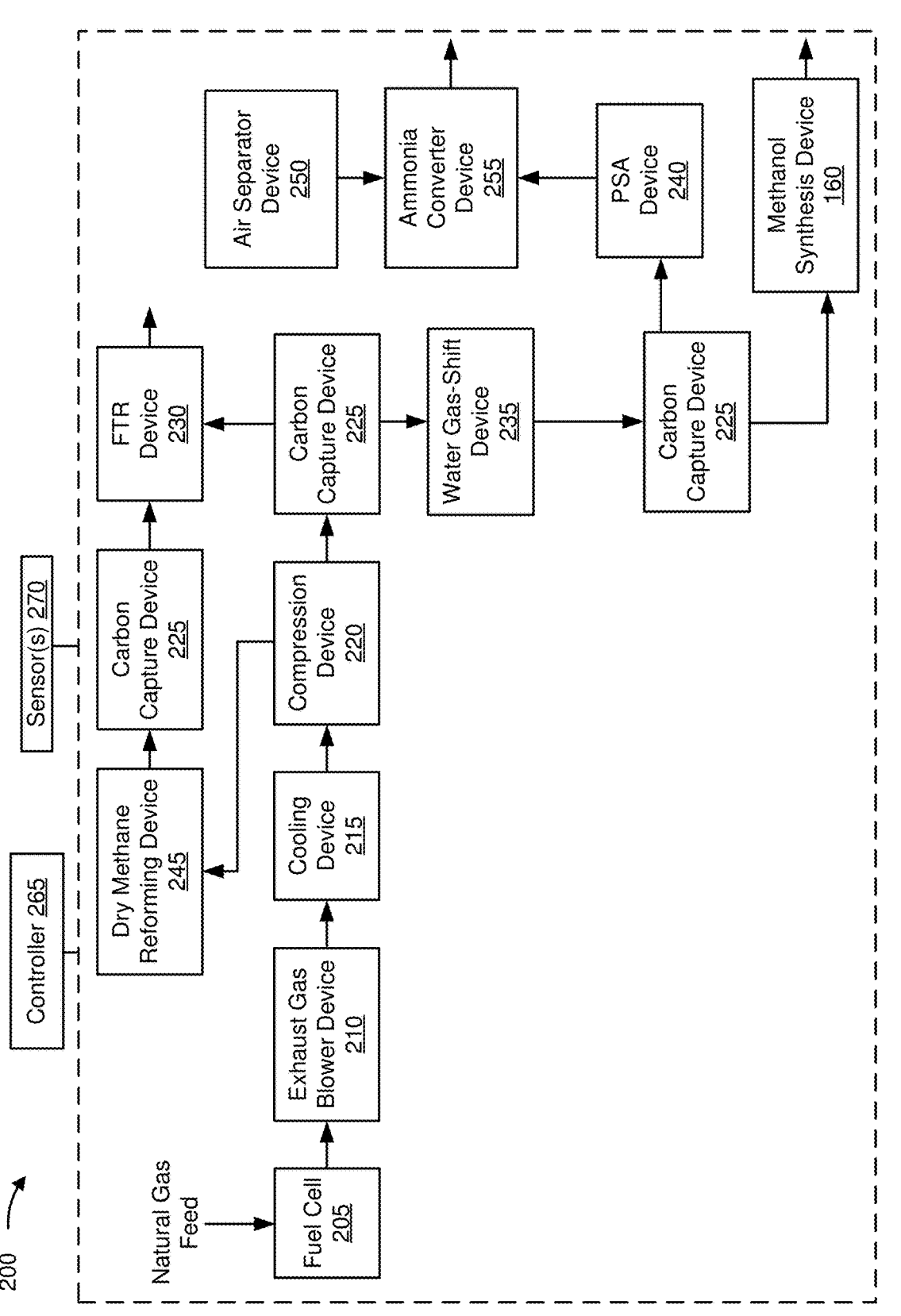
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include a fuel cell 205 (e.g., which may correspond to the fuel cell 105), an exhaust gas blower device 210 (e.g., which may correspond to the exhaust gas blower device 110), a cooling device 215 (e.g., which may correspond to the cooling device 115), a compression device 220 (e.g., which may correspond to the compression device 120), a carbon capture device 225 (e.g., which may correspond to the carbon capture device 125), an FTR device 230 (e.g., which may correspond to the FTR device 130), a water gas-shift device 235 (e.g., which may correspond to the water gas-shift device 135), a PSA device 240 (e.g., which may correspond to the PSA device 140), a dry methane reformer device 245 (e.g., which may correspond to the dry methane reformer device 145), an air separator device 250 (e.g., which may correspond to the air separator device 150), an ammonia converter device 255 (e.g., which may correspond to the ammonia converter device 155), and a methanol synthesis device 260 (e.g., which may correspond to the methanol synthesis device 160), a controller 265, and one or more sensors (e.g., shown as sensor(s) 270 in FIG. 2). Devices of environment 200 may interconnect via wired connections, wireless connections, or a combination of wired and wireless connections.

The fuel cell 205 may be a solid oxide fuel cell, as described in more detail elsewhere herein. Although the fuel cell 205 is described as being a solid oxide fuel cell, the fuel cell 205 may be any suitable fuel cell (e.g., that produces exhaust gases that may be treated as described in more detail elsewhere herein).

The exhaust gas blower device 210 may include one or more components (e.g., one or more centrifugal blowers, axial fans, and/or positive displacement blowers) designed to control a flow of gases, such as a flow of exhaust gases produced by the fuel cell 205. Accordingly, for example, the exhaust gas blower device 210 may facilitate the transport of exhaust gases from the fuel cell 205 to one or more downstream components (e.g., one or more components of the example environment 200 of FIG. 2).

The cooling device 215 may include one or more components (e.g., one or more heat exchangers, condensers, and/or other thermal management components) that regulate a temperature of one or more gases that may be processed by one or more components of the example environment 200 of FIG. 2.

The compression device 220 may include one or more components that control and/or regulate a pressure (e.g., increase a pressure) of gases that may be processed by one or more components of the example environment 200 of FIG. 2.

The carbon capture device 225 may include one or more systems (e.g., absorption, adsorption, and/or membrane-based separation systems, among other examples) designed to remove carbon dioxide from gases (e.g., a syngas). For example, the carbon capture device 225 may use technologies such as amine scrubbing or and//or PSA to capture carbon dioxide for sequestration and/or chemical conversion, among other examples.

The FTR device 230 may include an FT reactor designed to convert syngas into liquid hydrocarbons. For example, the FTR device 230 may use catalysts, such as cobalt or iron to produce synthetic fuels, waxes, and/or chemicals, among other examples.

The water gas-shift device 235 may include one or more reactors designed to convert carbon monoxide and water vapor into carbon dioxide and additional hydrogen. For example, the water gas-shift device 235 may enhance hydrogen production for various applications, such as ammonia synthesis and/or or refining applications, among other examples.

The PSA device 240 may include one or more PSA systems designed to separate hydrogen and/or other gases from a gas (e.g., a syngas). For example, the PSA device 240 may use zeolites and/or activated carbon to purify hydrogen for the fuel cell 205 and/or ammonia synthesis, among other examples.

The dry methane reformer device 245 may include a dry methane reformer designed to generate syngas by reacting methane with carbon dioxide. For example, the dry methane reformer device 245 may produce a balanced water vapor/ carbon dioxide ($H_2$/CO) ratio suitable for FT synthesis and/or methanol production, among other examples.

The air separator device 250 may include one or more systems (e.g., one or more cryogenic distillation units, PSA systems, and/or membrane separators, among other examples) designed to isolate oxygen and nitrogen from air. The air separator device 250 may supply oxygen and/or nitrogen for various purposes (e.g., the air separator device 250 may supply oxygen for syngas production and/or nitrogen for ammonia synthesis, among other examples).

The ammonia converter device 255 may include one or more catalytic reactors designed to convert hydrogen and nitrogen into ammonia (e.g., using a haber-bosch process, among other examples). The ammonia converter device 255 may produce ammonia for various applications, such as producing ammonia for fertilizer and/or hydrogen storage applications, among other examples.

The methanol synthesis device 260 may include one or more catalytic reactors designed to convert syngas into methanol through hydrogenation of carbon monoxide and/or carbon dioxide. The methanol synthesis device 260 may produce methanol for various applications, such as for fuel and/or chemical feedstock applications.

The controller 265 may include circuitry configured to control and/or regulate an operation of one or devices and/or one or more components of the example environment 200 of FIG. 2. For example, the controller 265 may adjust one or more parameters, such as one or more fuel flow rates, operating temperatures, and/or power outputs based on input (e.g., sensed input, among other examples). Additionally, the functionality of the elements described herein may be implemented using circuitry or processing circuitry, including general-purpose processors, special-purpose processors, integrated circuits, application-specific integrated circuits (ASICs), conventional circuitry, or combinations thereof, configured or programmed to perform the disclosed functionality. A processor is a type of processing circuitry, as it includes transistors and other physical circuit components. A processor may execute instructions stored in a memory, thereby operating as a programmed processor. In this disclosure, the terms "circuitry," "units," or "means" refer to hardware that performs, or is programmed to perform, the described functionality. Such hardware may include any disclosed hardware or other known hardware that is configured or programmed to execute the described functions. When the hardware includes a processor, which is a type of circuitry, the circuitry, means, or units refer to a combination of hardware and software, where the software configures the hardware and/or processor to perform the specified functions.

The sensor(s) 270 may include one or more temperature sensors, pressure transducers, gas analyzers, and/or other devices designed to measure one or more operating conditions and/or environmental conditions associated with the systems and methods described herein. For example, the sensor(s) 270 may provide data (e.g., real-time data or near real-time data) associated with one or more temperatures, pressures, gas compositions, and/or electrical outputs (e.g., of the fuel cell 205) to support process control and/or system adjustments, among other examples.

Accordingly, some implementations described herein enable fuel cell exhaust gas processing. For example, the exhaust gases produced by the fuel cell (e.g., the fuel cell 105 and/or the fuel cell 205) may be processed to generate one or products (e.g., one or more GTL products), such as liquid hydrocarbons, hydrogen, ammonia, and/or methanol, as described in more detail elsewhere herein.

In some implementations, one or more components of the example 100 of FIGS. 1A-1H and/or one or more components of the example environment 200 of FIG. 2 may be used as a fuel cell system to generate electricity and to generate one or more GTL products. For example, the fuel cell system may include a solid oxide fuel cell stack (e.g., including multiple fuel cells) that generates electricity, which may be used for various purposes. For example, the solid oxide fuel cell stack may generate electricity for a gas-to-liquids plant and/or a data center (e.g., an artificial intelligence data center), among other examples.

In some implementations, the fuel cell system may regulate an amount of electricity generated by the solid oxide fuel cell stack (e.g., using a controller and based on feedback from one or more sensors, among other examples). For example, a controller may regulate a natural gas feedstock fed to the solid oxide fuel cell stack, based on sensor data, to regulate the amount of electricity generated by the fuel cell stack.

For example, if the fuel cell system is used to provide electricity to a GTL plant (e.g., that generates one or more GTL products), the fuel cell system may integrate a control system that actively regulates a flow rate of the natural gas feedstock supplied to the solid oxide fuel cell stack, ensuring that the electricity generation precisely matches a power demand of the GTL plant. The solid oxide fuel cell stack may operate at high temperatures (e.g., typically 700-1000° C.), utilizing an electrochemical reaction to convert the chemical energy of natural gas into electricity with high efficiency. The control system may receive input signals from one or more sensors (e.g., one or more power demand sensors, voltage sensors, current sensors, and/or thermal management sensors, among other examples). The control system may adjust, based on the input signals, the flow rate of the natural gas feedstock fuel supply (e.g., through a variable flow regulator and/or an electronic control valve). For example, the control system may be used to modulate a fuel-to-air ratio to optimize an operating point of the solid oxide fuel cell stack, ensuring balanced electricity generation while preserving stable performance and thermal stability.

In some implementations, the fuel cell system may include a heat recovery system that captures excess heat generated as a byproduct by the solid oxide fuel cell stack. The heat recovery system may provide thermal energy for one or more GTL purposes associated with the GTL plant (e.g., one or more steam reforming processes and/or other heat-intensive chemical reactions, among other examples). This closed-loop configuration enhances system efficiency, fuel utilization, and operational stability while providing a power supply to the GTL plant.

Additionally, or alternatively, one or more components of the example 100 of FIGS. 1A-1H and/or one or more components of the example environment 200 of FIG. 2 may process the exhaust gases generated as a byproduct of the solid oxide fuel cell stack for various purposes, as described in more detail elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment

200 may perform one or more functions described as being performed by another set of devices of environment 200.

Figure 3:
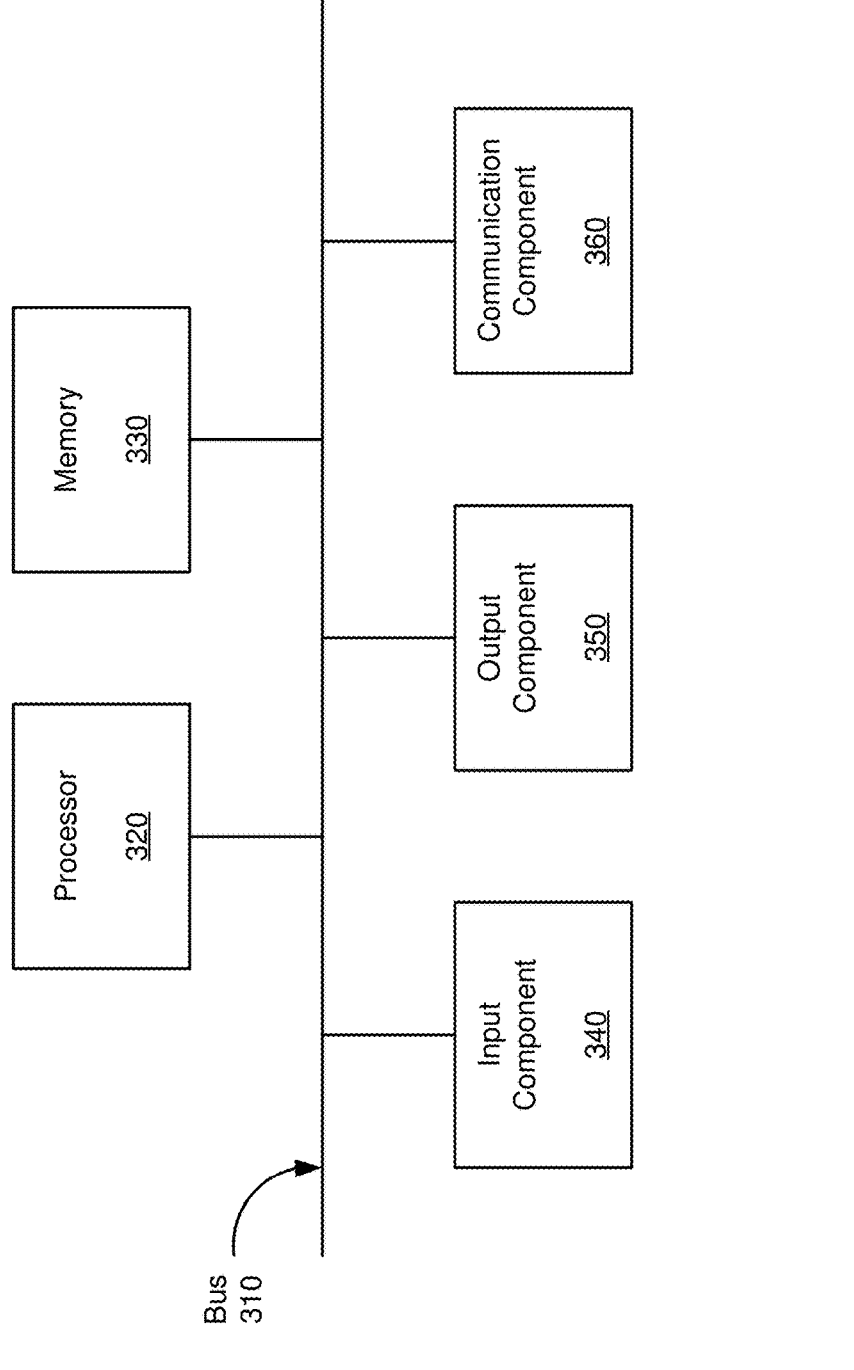
FIG. 3 is a diagram of example components of a device associated with fuel cell exhaust gas processing.

FIG. 3 is a diagram of example components of a device 300 associated with fuel cell exhaust gas processing. The device 300 may correspond to the controller 265 that controls one or more devices and/or one or more components of FIGS. 1A-1H and/or FIG. 2). As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with fuel cell exhaust gas processing. In some implementations, one or more process blocks of FIG. 4 may be performed by a device (e.g., one or more devices of FIGS. 1A-1H and/or FIG. 2). In some implementations, one or more process blocks of FIG. 4 may be performed by another device, or a group of devices separate from or including the device. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, the process 400 may include cooling exhaust gases including water vapor, carbon dioxide, nitrogen, hydrogen, and carbon monoxide (block 410). For example, a cooling device may be configured to cool exhaust gases, generated by a solid oxide fuel cell, including water vapor, carbon dioxide, nitrogen, hydrogen, and carbon monoxide to produce cooled exhaust gases, as described in more detail elsewhere herein.

As further shown in FIG. 4, the process 400 may include compressing the cooled exhaust gases to produce compressed exhaust gases (block 420). For example, a compression device may be configured to compress the cooled exhaust gases to produce the compressed exhaust gases, as described in more detail elsewhere herein.

As further shown in FIG. 4, the process 400 may include capturing at least a portion of the carbon dioxide from the compressed exhaust gases to produce treated exhaust gases in which the hydrogen and the carbon monoxide are majority components of the treated exhaust gases (block 430). For example, a carbon capture device may be configured to capture at least a portion of the carbon dioxide from the compressed exhaust gases to produce treated exhaust gases in which the hydrogen and the carbon monoxide are majority components of the treated exhaust gases, as described in more detail elsewhere herein.

In some implementations, the process 400 may include processing, by a fischer-tropsch reactor device, the treated exhaust gases to generate liquid hydrocarbons. In some implementations, the process 400 may include processing, by a water gas-shift device, the treated exhaust gases to produce hydrogen-enriched gases, and processing, by a pressure swing adsorption device, the hydrogen-enriched gases to generate hydrogen.

In some implementations, the process 400 may include reacting, by an ammonia converter device, the hydrogen with nitrogen to generate ammonia. In some implementations, the process 400 may include processing, by a methanol synthesis device, the treated exhaust gases to generate methanol. In some implementations, the process 400 may include processing, by a dry methane reformer device, the compressed exhaust gases to produce reformed exhaust gases, processing, by a carbon capture device, the reformed exhaust gases to capture at least a portion of the carbon dioxide from the reformed exhaust gases to produce treated reformed exhaust gases, and processing, by a pressure swing adsorption device, the treated reformed exhaust gases to generate carbon monoxide and hydrogen.

In some implementations, the process 400 may include receiving, by the solid oxide fuel cell, a natural gas feedstock and processing, by the solid oxide fuel cell, the natural gas feedstock to generate electricity. The exhaust gases may be generated as a byproduct of processing the natural gas feedstock.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1H. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:

a solid oxide fuel cell configured to process a natural gas feedstock to generate electricity and to generate exhaust gases as a byproduct, wherein the exhaust gases include water vapor, carbon dioxide, nitrogen, hydrogen, and carbon monoxide;

a cooling device configured to:

receive the exhaust gases from the solid oxide fuel cell, and cool the exhaust gases to produce cooled exhaust gases, wherein cooling the exhaust gases condenses at least a portion of the water vapor in the exhaust gases;

a compression device configured to compress the cooled exhaust gases to produce compressed exhaust gases; and a carbon capture device configured to capture at least a portion of the carbon dioxide from the compressed exhaust gases to produce treated exhaust gases, wherein the hydrogen and the carbon monoxide are majority components of the treated exhaust gases, wherein the cooling device, compression device, and carbon capture device are arranged in series, wherein the exhaust gases sequentially flow from the cooling device to the compression device to the carbon capture device, wherein the system is configured to use the treated exhaust gases as a primary feedstock for gas-to-liquid synthesis without electrochemical reduction of the carbon dioxide in the exhaust gases.

2. The system of claim 1, further comprising:

a fischer-tropsch reactor device configured to process the compressed exhaust gases to generate liquid hydrocarbons.

3. The system of claim 1, further comprising:

a water gas shift device configured to process the compressed exhaust gases to produce hydrogen-enriched gases; and a pressure swing adsorption device configured to process the hydrogen-enriched gases to generate hydrogen.

4. The system of claim 3, further comprising:

an ammonia converter device configured to react the hydrogen with nitrogen to generate ammonia.

5. The system of claim 1, further comprising:

a methanol synthesis device configured to process the treated exhaust gases to generate methanol.

6. The system of claim 1, further comprising:

a dry methane reformer device configured to process the exhaust gases to produce reformed exhaust gases;

a carbon capture device configured to capture at least a portion of the carbon dioxide from the reformed exhaust gases to produce treated reformed exhaust gases; and at least one of:

a fischer-tropsch reactor device configured to process the treated reformed exhaust gases to generate liquid hydrocarbons, or a pressure swing adsorption device configured to process the treated reformed exhaust gases to generate carbon monoxide and hydrogen.

7. The system of claim 1, further comprising:

receiving, by the solid oxide fuel cell, a natural gas feedstock; and processing, by the solid oxide fuel cell, the natural gas feedstock to generate electricity, wherein the exhaust gases are generated as a byproduct of processing the natural gas feedstock to generate the electricity.

8. A method, comprising:

processing, by a solid oxide fuel cell, a natural gas feedstock to generate electricity and to generate exhaust gases as a byproduct, wherein the exhaust gases include water vapor, carbon dioxide, nitrogen, hydrogen, and carbon monoxide;

receiving, by a cooling device, the exhaust gases from the solid oxide fuel cell;

cooling, by the cooling device, the exhaust gases, wherein cooling the exhaust gases condenses at least a portion of the water vapor to produce cooled exhaust gases;

compressing, by a compression device, the cooled exhaust gases to produce compressed exhaust gases; and capturing, by a carbon capture device, at least a portion of the carbon dioxide from the compressed exhaust gases to produce treated exhaust gases, wherein the hydrogen and the carbon monoxide are majority components of the treated exhaust gases, wherein the cooling device, compression device, and carbon capture device are arranged in series, wherein the exhaust gases sequentially flow from the cooling device to the compression device to the carbon capture device, wherein the system is configured to use the treated exhaust gases as a primary feedstock for gas-to-liquid synthesis without electrochemical reduction of the carbon dioxide in the exhaust gases.

9. The method of claim 8, further comprising:

processing, by a fischer-tropsch reactor device, the treated exhaust gases to generate liquid hydrocarbons.

10. The method of claim 8, further comprising:

processing, by a water gas-shift device, the treated exhaust gases to produce hydrogen-enriched gases; and processing, by a pressure swing adsorption device, the hydrogen-enriched gases to generate hydrogen.

11. The method of claim 10, further comprising:

reacting, by an ammonia converter device, the hydrogen with nitrogen to generate ammonia.

12. The method of claim 8, further comprising:

processing, by a methanol synthesis device, the treated exhaust gases to generate methanol.

13. The method of claim 8, further comprising:

processing, by a dry methane reformer device, the compressed exhaust gases to produce reformed exhaust gases;

processing, by a carbon capture device, the reformed exhaust gases to capture at least a portion of the carbon dioxide from the reformed exhaust gases to produce treated reformed exhaust gases; and processing, by a pressure swing adsorption device, the treated reformed exhaust gases to generate carbon monoxide and hydrogen.

14. The method of claim 8, further comprising:

receiving, by the solid oxide fuel cell, a natural gas feedstock; and processing, by the solid oxide fuel cell, the natural gas feedstock to generate electricity, wherein the exhaust gases are generated as a byproduct of processing the natural gas feedstock.

15. A non-transitory computer-readable medium storing a set of instructions, the set of instructions comprising:

one or more instructions that, when executed by one or more processors of a device, cause the device to:

cause a solid oxide fuel cell to process a natural gas feedstock to generate electricity and to generate exhaust gases as a byproduct, wherein the exhaust gases include water vapor, carbon dioxide, nitrogen, hydrogen, and carbon monoxide, cause a cooling device to:

receive the exhaust gases from the solid oxide fuel cell, and cool the exhaust gases to produce cooled exhaust gases, wherein cooling the exhaust gases condenses at least a portion of the water vapor in the exhaust gases;

cause a compression device to compress the cooled exhaust gases to produce compressed exhaust gases; and cause a carbon capture device to capture at least a portion of the carbon dioxide from the compressed exhaust gases to produce treated exhaust gases, wherein the hydrogen and the carbon monoxide are majority components of the treated exhaust gases, wherein the cooling device, compression device, and carbon capture device are arranged in series, wherein the exhaust gases sequentially flow from the cooling device to the compression device to the carbon capture device, wherein the system is configured to use the treated exhaust gases as a primary feedstock for gas-to-liquid synthesis without electrochemical reduction of the carbon dioxide in the exhaust gases.

16. The non-transitory computer-readable medium of claim 15, wherein the one or more instructions that, when executed by the one or more processors of the device, further cause the device to:

cause a fischer-tropsch reactor device to process the compressed exhaust gases to generate liquid hydrocarbons.

17. The non-transitory computer-readable medium of claim 15, wherein the one or more instructions that, when executed by the one or more processors of the device, further cause the device to:

cause a water gas shift device to process the compressed exhaust gases to produce hydrogen-enriched gases; and cause a pressure swing adsorption device to process the hydrogen-enriched gases to generate hydrogen.

18. The non-transitory computer-readable medium of claim 17, wherein the one or more instructions that, when executed by the one or more processors of the device, further cause the device to:

cause an ammonia converter device to react the hydrogen with nitrogen to generate ammonia.

19. The non-transitory computer-readable medium of claim 15, wherein the one or more instructions that, when executed by the one or more processors of the device, further cause the device to:

cause a methanol synthesis device to process the treated exhaust gases to generate methanol.

20. The non-transitory computer-readable medium of claim 15, wherein the one or more instructions that, when executed by the one or more processors of the device, further cause the device to:

cause a dry methane reformer device to process the exhaust gases to produce reformed exhaust gases;

cause a carbon capture device to capture at least a portion of the carbon dioxide from the reformed exhaust gases to produce treated reformed exhaust gases; and cause at least one of:

a fischer-tropsch reactor device to process the treated reformed exhaust gases to generate liquid hydrocarbons, or a pressure swing adsorption device to process the treated reformed exhaust gases to generate carbon monoxide and hydrogen.

* * * * *